(12) United States Patent
Janssen et al.

(10) Patent No.: US 10,193,705 B2
(45) Date of Patent: Jan. 29, 2019

(54) METHOD, COMMUNICATION NETWORK, AND CONTROL UNIT FOR THE CYCLICAL TRANSMISSION OF DATA

(75) Inventors: Dirk Janssen, Verl (DE); Hans Beckhoff, Verl (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 1025 days.

(21) Appl. No.: 12/096,973

(22) PCT Filed: Dec. 13, 2006

(86) PCT No.: PCT/EP2006/011964
§ 371 (c)(1),
(2), (4) Date: Oct. 27, 2008

(87) PCT Pub. No.: WO2007/073862
PCT Pub. Date: Jul. 5, 2007

(65) Prior Publication Data
US 2009/0129395 A1 May 21, 2009

(30) Foreign Application Priority Data
Dec. 15, 2005 (DE) .................. 10 2005 060 085

(51) Int. Cl.
*H04L 12/28* (2006.01)
*H04L 12/403* (2006.01)
(Continued)

(52) U.S. Cl.
CPC .......... *H04L 12/403* (2013.01); *H04L 12/413* (2013.01); *H04L 12/417* (2013.01)

(58) Field of Classification Search
CPC ........ H03L 12/42; H04L 12/403; H04L 12/56
(Continued)

(56) References Cited

U.S. PATENT DOCUMENTS 5,301,185 A * 4/1994 Cherry .......................... 370/216
5,465,254 A 11/1995 Wilson et al.
(Continued)

FOREIGN PATENT DOCUMENTS

DE 19721740 A1 11/1998
DE 10206904 A1 9/2003
(Continued)

OTHER PUBLICATIONS

Kopetz et al., Specification of the TTP/A—protocol V2.00 Sep. 2002.*
(Continued)

*Primary Examiner* — Noel R Beharry
*Assistant Examiner* — Lionel Preval
(74) *Attorney, Agent, or Firm* — Dorsey & Whitney LLP

(57) ABSTRACT

In order to transmit data on a transmission path to which a control unit and several nodes are connected, the control unit cyclically outputs data in a continuous manner onto the transmission path during the entire transmission cycle time in the form of telegrams by taking into account the transmission standard, the nodes exchanging data with the telegrams during the cycle. The control unit subdivides the transmission cycle into a number of subcycles that have the same length. At least one communication telegram into which a first node can write data for a second node located downstream on the transmission path during the cycle, is sent in each subcycle.

20 Claims, 6 Drawing Sheets

(51) Int. Cl.
*H04L 12/413* (2006.01)
*H04L 12/417* (2006.01)

(58) Field of Classification Search
USPC ....... 370/400, 404, 216, 458, 403, 447, 245, 370/455; 709/232
See application file for complete search history.

(56) References Cited

U.S. PATENT DOCUMENTS

| | | | |
|---|---|---|---|
| 6,028,864 A * | 2/2000 | Marttinen et al. | 370/403 |
| 6,301,261 B1 * | 10/2001 | Nakatsugawa et al. | 370/455 |
| 6,381,647 B1 * | 4/2002 | Darnell et al. | 709/232 |
| 6,414,941 B1 * | 7/2002 | Murakami | 370/245 |
| 6,747,985 B1 | 6/2004 | Lovette | |
| 7,339,948 B2 * | 3/2008 | Balasubramanian et al. | 370/458 |
| 7,706,398 B2 * | 4/2010 | Jung et al. | 370/447 |
| 2002/0073223 A1 * | 6/2002 | Darnell et al. | 709/232 |
| 2005/0129037 A1 * | 6/2005 | Zumsteg et al. | 370/404 |

FOREIGN PATENT DOCUMENTS

| | | |
|---|---|---|
| DE | 10220334 A1 | 11/2003 |
| DE | 10337699 A1 | 3/2005 |
| EP | 0847165 A1 | 6/1998 |
| WO | WO 2003/054644 A | 7/2003 |
| WO | WO 2005/066728 A | 7/2005 |

OTHER PUBLICATIONS

Ethercat Technical Overview (Year: 2004).*
Ethercat Solution (Year: 2004).*
High Speed industrial Ethernet for semiconductor equipment (Year: 2004).*
FTT-Ethernet (Year: 2005).*
International Search Report for PCT/EP2006/011964.
German office action.
Hammond, Joseph L. et al. "Performance Analysis of Local Computer Networks", Reading, Massachusetts, US Addison-Wesley Publishing Company, 1986, pp. 244-249.
W. Elmenreich et al., "TTP/A Smart Transducer Programming: A Beginner's Guide," Institut für Technische Informatik (Vienna), Version 0.5, Jan. 3, 2005 (68 pages).
Decision on Third Party Opposition filed for German Patent Application No. 102005060085.9, dated Jul. 2, 2009, with English translation (34 pages).
"Peripherals Communication Protocol Version 2.0," INTERBUS, with English translation (36 pages).

* cited by examiner

METHOD, COMMUNICATION NETWORK, AND CONTROL UNIT FOR THE CYCLICAL TRANSMISSION OF DATA

CROSS-REFERENCE TO RELATED APPLICATION

This Application is a Section 371 National Stage Application of International Application No. PCT/EP2006/011964, filed 13 Dec. 2006 and published as WO 2007/073862 A1 on 5 Jul. 2007, which claims the priority from the German application 10 2005 060 085.9, filed 15 Dec. 2005, the subject matter of which are hereby incorporated by reference in its entirety.

BACKGROUND OF THE INVENTION

The present invention relates to a method, a communication network and a control unit for cyclically transmitting data, particularly in the form of Ethernet telegrams.

The Ethernet is the most widespread technology by means of which data may currently be transmitted at a rate of up to 100 million bits per second within local communication networks, so-called Local Area Networks. LANs are local communication networks limited to a geographical area and comprise at least a control unit and several work stations, also called nodes, as participants, which are connected by means of a transmission path such as a coaxial cable, a glass fibre cable or a twisted pair cable.

LANs are operated by means of a network operating system and a unified network protocol. The Ethernet represents a potential network protocol and thereby supports varying kinds of communication protocols, such as the TCP/IP protocol or the IPX protocol. In the OSI layer model, the international reference model for data communication in networks consisting of a layer stack comprising seven layers, an amount of protocols being defined for each layer and the protocols providing their services to the respective next higher layer, the Ethernet protocol is assigned to the second layer, the so-called conductor layer. In this conductor layer, the data to be sent are concentrated to form telegrams to which specific information relating to the respective communication protocol are added. In the network, the conductor layer is responsible for transporting the data telegrams from one participant to the other and for detecting errors.

In the Ethernet concept, the conductor layer is divided up into two levels, the first level adding to the data a header, a so-called start identification, which comprises information required by the receiving protocol for a correct data transmission. On the second level of the Ethernet protocol, the telegram is then encapsulated by means of an additional preamble and an end section, a so-called check sum, for transporting it from participant to participant. By means of such an Ethernet telegram, data having a length of up to 1500 bytes may be transmitted, whereby fixed break intervals have to be observed between the individual Ethernet telegrams.

For sending and receiving the Ethernet telegrams via the Ethernet transmission path, an Ethernet controller is typically responsible, also referred to as media access controller, which is connected between the control unit and the Ethernet transmission path. The MAC controller generally comprises a sending and a receiving shift register in order to decouple the Ethernet transmission path from the physical memory of the control unit. Current Ethernet controllers further typically comprise a possibility of directly accessing the physical memory, a so-called direct memory access mode, by means of which the Ethernet telegrams to be sent and to be received may be directly stored in the memory or retrieved therefrom, respectively, in a time-saving manner.

Ethernet protocols are predominantly used in office communication networks. Due to the advantages of the Ethernet concept when using standard hardware and software components as well as the possibility of achieving high data transmission rates with a simple network technology, Ethernet communication networks are also increasingly used in industrial manufacturing for the data exchange between work stations. When using the Ethernet protocol in automation, the real time capability of the Ethernet data transmission has to be ensured. When controlling machines it is typically required to carry out a cyclic processing of a control task essentially without time variations, i.e. so-called jittering, the standard requirement being responded within a predictable reply time.

If Ethernet telegrams are to be cyclically transmitted e.g. within the framework of a real time application running on the Ethernet network in order to address sensors and actuators connected by the Ethernet transmission path, the control unit in each control cycle transfers the respective Ethernet telegrams to its MAC controller for transmission. Thereby, prior to the transfer to the MAC controller, the control unit automatically adds the break intervals, start identifications, preambles and check sums defined in the Ethernet transmission standard (IEEE 802.3) to the data to be sent. The MAC controller then uploads the Ethernet telegrams into its transmission shift register, particularly by means of the DMA mode, and if a particular charging level of the transmission shift register is achieved, the MAC controller starts to transmit the Ethernet telegrams on the Ethernet transmission path.

Present-day manufacturing and processing techniques are increasingly marked by rapid control tasks. As a result, the control unit in the communication network used for industrial automation has to react to standard requirements with increasing speed. In this manner, response times in the microsecond range are required for controlling technical processes, e.g. in the plastics industry. In order to safeguard such rapid reaction times, a high performance processing unit is necessary for the control unit in LAN networks in order to guarantee cycle times in the microsecond range which in turn results in high hardware costs.

There is a need for a method for transmitting data, a communication network and a control unit for such a communication network by means of which data may be cyclically distributed among data communication participants at high frequencies.

SUMMARY OF THE INVENTION

According to an embodiment, a method transmits data on a transmission path to which a control unit and several nodes are connected. The control unit cyclically outputs data in the form of telegrams to the transmission path, thereby controlling the transmission process in order to continuously output telegrams during the entire transmission cycle time taking the transmission standard into account. The nodes exchanges data with the telegrams when passing through. Further the control unit subdivides the transmission cycle into a number of subcycles having the same length, the control unit transmitting at least one communication telegram in each subcycle into which a first node may write data for a second node located downstream in the transmission path into the communication telegram when passing through.

According to a further embodiment, a communication network comprises a transmission path to which a control unit and several nodes are connected. The control unit cyclically outputs data in the form of telegrams to the transmission path, thereby controlling the transmission process in order to continuously output telegrams during the entire transmission cycle time taking the transmission standard into account. The nodes exchanges data with the telegrams when passing through. Further the control unit subdivides the transmission cycle into a number of subcycles having the same length, the control unit transmitting at least one communication telegram in each subcycle into which a first node may write data for a second node located downstream in the transmission path into the communication telegram when passing through.

According to a further embodiment, a control unit for a communication network comprises a transmission path to which the control unit and a plurality of nodes are connected. The control unit comprises a processing unit for converting data to be sent into telegrams according to a transmission standard, and a transmission unit for cyclic transmission of the provided telegrams on the transmission path. The processing unit controls the transmission operation of the transmission unit in order to continuously output telegrams during the entire transmission cycle time considering the transmission standard. The processing unit subdivides the transmission cycle into a number of subcycles having the same length and provides at least one communication telegram in each subcycle into which a first node may write data for a second node located downstream in the transmission path when passing through.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Local communication networks allow for the sharing of data and resources among participants, generally computers and machines, in a simple manner. Thereby, the Ethernet concept is the most widespread communication standard among LANs. The invention is explained by example of an Ethernet communication network. However, it is possible to operate any LAN communication network in the inventive manner.

The Ethernet communication network is based on an LAN configuration in which a plurality of participants is connected to each other via a shared transmission path, whereby the data to be transmitted are encapsulated in data packages, referred to as Ethernet telegrams in the following, with a predetermined format. Thereby, the Ethernet consists of three areas, namely the transmission path and the network interfaces, the amount of protocols controlling the access to the Ethernet transmission path, and the Ethernet telegram format. The Ethernet communication network is basically a bus system in which any desired network topologies, e.g. star, bus or tree networks, may be used.

The Ethernet protocol has established itself as a communication standard for network systems not only in office communication but in industrial automation as well, since standard hardware components and standard software protocols may be used and high data transmission rates may moreover be achieved.

Figure 1A:
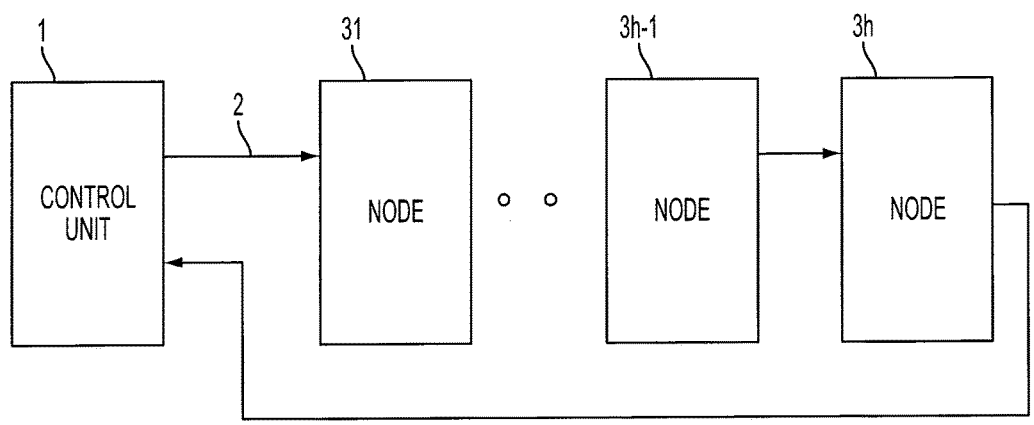
FIG. 1A shows an inventive communication network.

FIG. 1A schematically shows an Ethernet network as used in industrial automation for carrying out control tasks. The Ethernet network comprises an Ethernet transmission path 2, by means of which a control unit 1 is connected to several nodes 3 (31, . . . 3n-1). The transmission path is e.g. an electrical conductor, an optical fibre or a radio cable. The control unit 1 is the active participant in the communication network and determines the data communication. Such a control unit 1 is e.g. a microcontroller serving as a process host computer in a manufacturing process. The control unit 1 comprises a network access authorisation and may output and receive telegrams to or via the transmission path 2. The nodes 3 in the communication network represent the peripheral machine devices such as I/O devices, valves, drives and transducers. They do not have their own access authorisation to the communication network, i.e. they must not output discrete telegrams to the network, but may only carry out a data exchange with the telegrams passing through the transmission path 2.

In the Ethernet network depicted in FIG. 1A, the participants in the transmission path 2 are connected to form a chain, whereby each node 3 is connected to two neighbouring devices, the first node 31 and the last node 3n being connected to the control unit 1. Data transmission takes place in one direction starting from the control unit 1 to the first node 31 and from there further on up to the last node 3n and then back to the control unit 1. In the embodiment shown in FIG. 1A, the Ethernet telegrams outputted onto the transmission path 2 by the control unit 1 are processed on their way by the nodes 3 when passing through and then back-fed from the last node 3n through all preceding nodes, if applicable, back to the control unit 1 without any further processing.

Figure 1B:
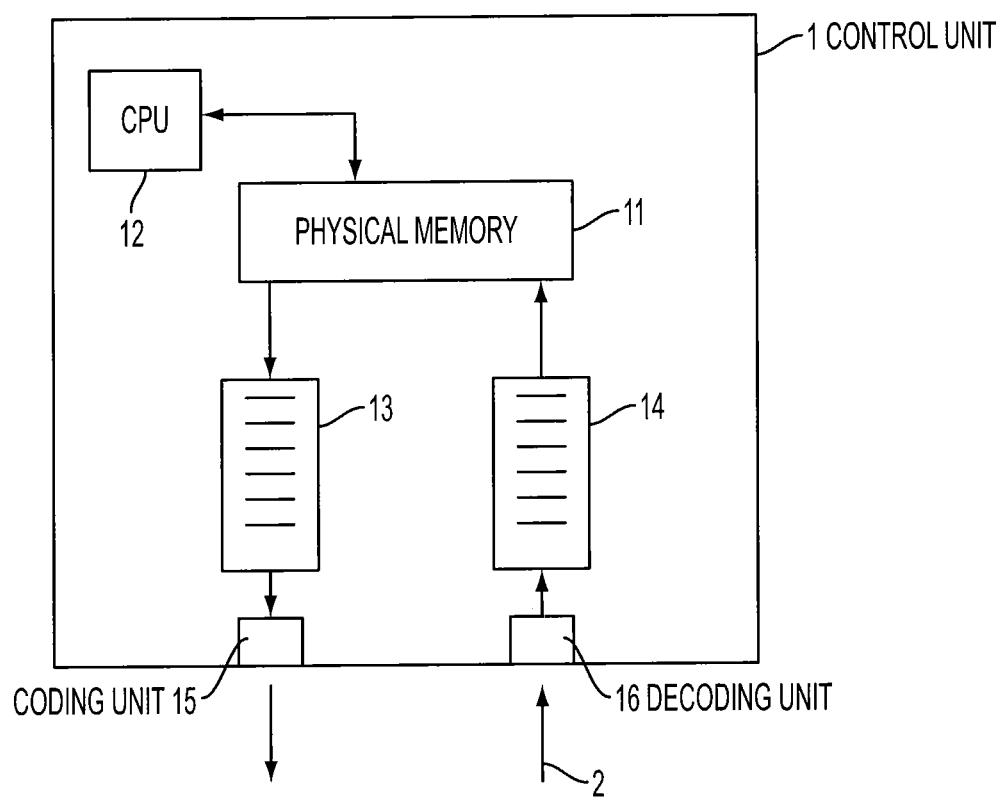
FIG. 1B depicts an inventive embodiment of a control unit in a communication network.

FIG. 1B shows an inventive control unit 1 for connection to the Ethernet transmission path 2. For transmitting the Ethernet telegrams on the transmission path 2, a coding unit 15 is provided, and for receiving the Ethernet telegrams from the transmission path 2, a decoding unit 16 is provided. A latch 13, 14 configured as a shift register is connected to the coding unit 15 or to the decoding unit 16, respectively, in order to latch the Ethernet telegrams to be sent or to be received, respectively. The coding unit 15, the decoding unit 16 and the two latches 13, 14 form the media access controller. The transmission and receipt shift registers 13, 14 of the MAC controller may be configured in such a way that a physical memory 11 may be directly accessed by means of a so-called direct memory access mode. It is alternatively possible to let the data exchange take place between the transmission shift register 13 or the receipt shift register 14, respectively, and the physical memory 11 via a central processing unit 12 of the control unit 1. However, the direct access by means of the DMA mode provides an accelerated data exchange.

The control of the data exchange in the control unit 14 is carried out by the CPU 12. The CPU 12 furthermore also manages all processes required for the operation of the Ethernet network, i.e. it carries out the management of the sending and receiving processes and provides an encapsulation of the data to be sent in the form of Ethernet telegrams or the unpacking of the data from the received Ethernet telegrams. The operating system implemented on the CPU 12 of the control unit 1 typically comprises a layered software structure in order to distinguish between protocol-specific processing and telegram- or hardware-specific processing. It is thereby possible to use varying communication protocols in the framework of the Ethernet standard without the necessity of carrying out hardware-specific driver modifications. At the same time, the hardware of the control unit may also be changed in that way without the requirement of additionally modifying protocol-specific software.

Figure 1C:
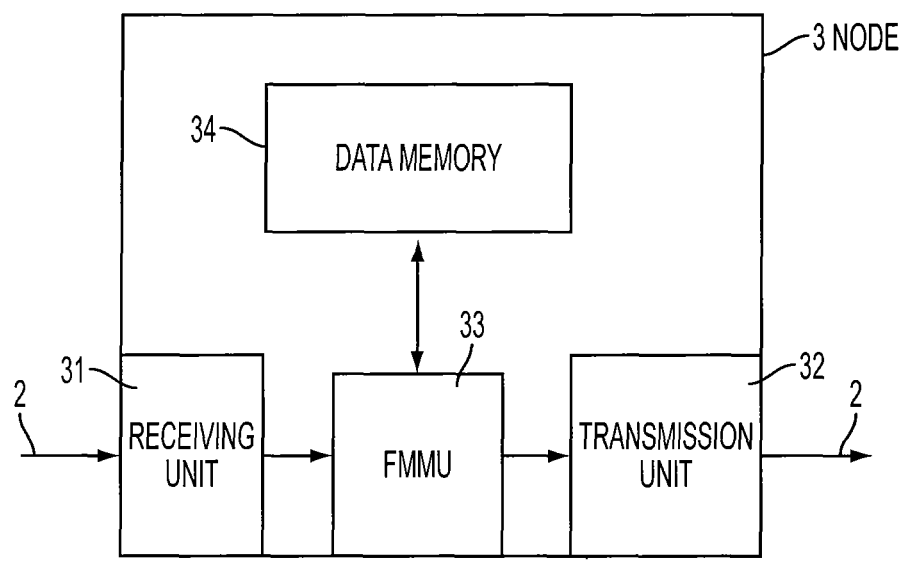
FIG. 1C shows an inventive embodiment of a node in the communication network.

FIG. 1C depicts the configuration of a node 3 at the Ethernet transmission path 2. The node 3 comprises a receiving unit 31 and a transmission unit 32 provided for receiving an Ethernet telegram or for transmitting an Ethernet telegram on the Ethernet transmission path 2, respectively. The transmission unit 32 and the receiving unit 32 are connected to an allocation unit 33, which in the following will be referred to as FMMU (field bus memory management unit) and in which the part of the bus protocol necessary for the respective node is implemented. The allocation unit 33 controls the data transfer between the telegrams passing on the transmission path 2 and the user data stored in a data memory 34 of the node 3. The user data may e.g. be measuring data or control data for carrying out a manufacturing process.

Figure 2A:
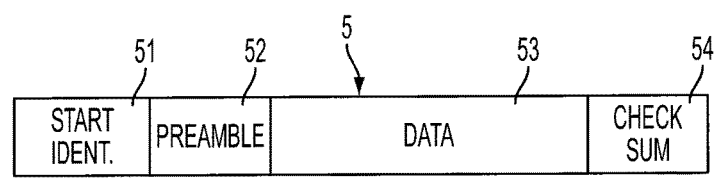
FIG. 2A shows a communication telegram.

FIG. 2A schematically depicts an Ethernet telegram 5 passing through the transmission path 2. Such a telegram may comprise up to 1500 bytes and consists of a header having a start identification 51, a preamble 52 identifying the target and source address as well as the data package type, a middle part 53 comprising the data, and an end part 34 comprising a check sum, the end part serving as a error detection mechanism.

When using LAN communication networks in industrial automation, it is necessary to ensure a real time data transmission. At the same time, for performing rapid control tasks it is necessary by means of the distributed LAN network that the individual nodes representing peripheral machine devices receive data having cycle times in the microsecond range largely free of jittering, i.e. without deviating from the desired cycle time. In order to ensure such rapid cycle times without jittering and at the same time to unload the control unit of the communication network or to allow for a reduction of the hardware involved in the control unit, according to the invention the control unit 1 cyclically and continuously outputs data in form of telegrams 5 to the transmission path 2 over the entire transmission cycle time, taking into account the transmission standards. Thereby, the control unit subdivides the transmission cycle into a number of subcycles having the same length, whereby at least one communication telegram is transmitted in each subcycle into which a first node 3 may write data for a second node 3 connected downstream in the transmission path 2. By continuously transmitting the telegrams in the transmission cycle of the control unit 1, a precise reproducibility of the transmission process and thus a jitter-free transmission of the telegrams are ensured. By subdividing the transmission cycle of the control unit 1 into subcycles, which each contain at least one communication telegram comprising data to be distributed to the individual nodes over which the nodes may also exchange data among each other, it is possible to operate the control unit with a slow transmission cycle clock unloading the control unit and not requiring any complex hardware, e.g. with a transmission cycle clock in the millisecond range, and at the same time to carry out control tasks having very fast control times, e.g. in the microsecond range, under real time conditions via the communication telegrams contained in the subcycles.

Figure 2B:
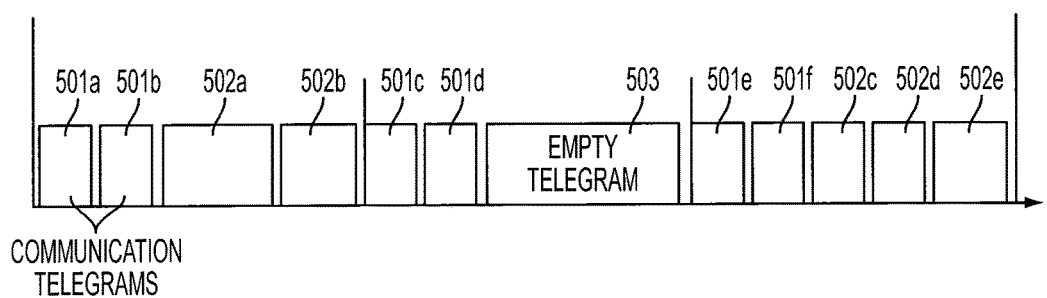
FIG. 2B depicts an inventive transmission process.

FIG. 2B depicts an example for an inventive configuration of a transmission cycle of a control unit 1. The transmission cycle which comprises 0.6 msec is subdivided into three subcycles a 200 μsec. For each subcycle, two communication telegrams 501 are provided, comprising data to be distributed among the nodes located downstream. In the communication telegram 501a first node may then write data for a further node located downstream in the transmission path 2 in the direction of transmission during passage of the telegrams. The two communication telegrams 501 are transmitted by the control unit at a fixed point of time in the subcycle, in the embodiment of FIG. 2 in the first and second place. After the two communication telegrams 501 have been sent, further telegrams 502 comprising additional data for the nodes may be transmitted in the subcycle or by "empty" telegrams 503, which only serve as a placeholder in order to fill up the transmission cycle. FIG. 2B shows two additional data telegrams 502a, 502b in the first subcycle, a placeholder telegram 503 in the second subcycle and three further data telegrams 502c, 502d, 502e in the third subcycle. Between the individual telegrams, the break interval required according to the transfer protocol is observed.

The transmission process of the Ethernet telegrams over the transmission path 2 is performed by the control unit 1 in such a way that the software driver used in the CPU 12 converts the data to be sent into the Ethernet telegrams, which are stored in the physical memory 11 if the control unit 3 operates in the DMA mode. The transmission shift register then accesses the stored Ethernet telegrams in order to upload the Ethernet telegrams 5 into the shift register. In the telegram sequence shown in FIG. 2B, at first the two communication telegrams 501a, 501b of the first subcycle, then the two further data telegrams 502a, 502b of the first subcycle, then the two communication telegrams 501c, 501d and the placeholder telegram 503 of the second subcycle, then the two communication telegrams 501e, 501f of the third subcycle and eventually the three data telegrams 502c, 502d, 502e of the third subcycle are transferred into the transmission shift register 13. In the same manner, the telegram sets of further transmission cycles are then stored in the transmission shift register 13. If sufficient Ethernet telegrams have been transferred from the physical memory 11 to the transmission shift register 13 under the control of the software driver of the CPU 12 in order to perform a continuous transmission process, the transmission shift register 13 outputs the latched Ethernet telegrams to the Ethernet transmission path 2 via the coding unit 15. However, an Ethernet transmission only takes place if the Ethernet network is quiet. Moreover, a collision preventing mechanism is typically additionally provided on the Ethernet transmission path 2.

If a control unit 1 is to control sensors and actuators connected to the Ethernet transmission path 2 as further nodes in real time, a jitter-free transmission sequence of the Ethernet telegrams 5 in the subcycle is required. When sending Ethernet telegrams, however, several jitter-afflicted processes occur and in a worst-case scenario, the jittering adds up. A first jitter results from fluctuating interrupt latency times of the operating system of the control unit 1 and of the software driver when realizing the Ethernet telegrams. Moreover, fluctuations in the running time occur in the data code which runs until the Ethernet telegrams are transmitted. In modern control units provided with a cache memory, fluctuations furthermore occur in one and the same passing data codes since depending on the cache content, the waiting times for the requested memory have may vary. Further jitters moreover result from transferring the Ethernet telegrams to the transmission shift register 13.

In order to compensate the jitter, according to the invention the CPU 12 of the control unit 1 is programmed in such a way that Ethernet telegrams 5 are sent out of the transmission shift register 13 without breaks. Thereby, the transmission shift register 13 and the connected coding unit 15 are controlled in such a way that after the transmission of an Ethernet telegram the next Ethernet telegram is directly transmitted observing the break interval defined in the Ethernet transmission standard.

In order to guarantee that during a subcycle duration defined by the control time Ethernet telegrams are continuously transmitted, the CPU 12 calculates how many Ethernet telegrams have to be transmitted for how long in order to exactly observe the predetermined subcycle time. In accordance with the Ethernet transmission standard, the CPU converts the data 53 to be sent into Ethernet telegrams 5 of corresponding length comprising a start identification 51, a preamble 52 and a check sum 54 and stores it in the physical memory 11. The transmission shift register 13 then accesses these Ethernet telegrams 5 and latches them. As soon as the transmission shift register 13 has reached a certain filling level, the transmission process is started, Ethernet telegrams being continuously sent, as shown in FIG. 2B for an entire transmission cycle of the control unit 1.

By means of the transmission shift register 13, the provision of the Ethernet telegrams by the CPU 12 in the physical memory 11 of the control unit 1 is decoupled from the point of time of transmission of the Ethernet telegrams, so that a potential jittering is compensated. Since the timing of the transmission process depends exclusively on the control unit 1 and on the transmission physics located downstream on the transmission path 2 and Ethernet telegrams 5 are continuously sent out of the transmission shift register 13, a precise reproducibility and thus a jitter-free transmission is possible.

When calculating the number and length of the Ethernet telegrams to be transmitted in a transmission cycle, the CPU 12 of the control unit 1 takes the baud rate used on the transmission path 2 into account as well as data automatically added when the data to be sent are encapsulated, i.e. the start identification 51, the preamble 52 and the check sum 54, as well as the break intervals to be observed between the Ethernet telegrams. These additional signals are defined in the Ethernet standard IEEE 802.3 and comprise 8 bit for a 100 Base TX Ethernet, i.e. a fast Ethernet having 100 MBaud for the start identification, 56 bit for the preamble, 32 bit for the check sum and 69 bit for the break interval.

The telegrams outputted by the transmission unit 1 via the coding unit 15 are interpreted by the nodes 3 connected by the transmission path 2 when passing through. By subdividing the transmission cycle into subcycles, which comprise communication telegrams for controlling real time processes at a fixed position, particularly in the first position, it is possible to initiate rapid control processes due to the higher frequency. Thereby, it is possible that the nodes 3 communicate with each other within a transmission cycle via the communication telegrams in the subcycle or exchange the process data required for the control processes. This is carried out in such a way that a preceding node writes data for a downstream node into a communication telegram when passing through, the written data being read out in the following and resulting in a corresponding control process. The data exchange between the nodes and the communication telegrams may be carried out in the manner explained below.

In order to have the FMMU unit 33 of the respective node 3 to extract or to transfer the data associated to it from the communication telegrams 501 to the transmission path 2, the FMMU unit 33 comprises a register unit 331 with several register data sets which correlate the passing communication telegram 501 with the data memory 34 in the respective node comprising the associated data. Each register data set 331 thereby comprises the following registers describing a connected memory area in the communication telegram 501: start address of the data area in the communication telegram; end address of the memory area in the communication telegram; start address of the data area in the data memory 34 of the node 3; type of data transmission: write or read.

Each register data set 331 thus indicates the start of the data in the communication telegram 501 associated with the respective node. By determining the data end in the register set, the length of the data in the communication telegram 501 associated with the respective node is determined. Instead of an end address, the register data set 331 can thus also comprise information on the length of the associated data area in the communication telegram 501. The information contained in the register data set 331 about the start of the data set in the data memory 34 of the node provides for the allocation of the data contained in the communication telegram to the data in the node. The type of data transmission in the register set subsequently determines if a write or read process between the nodes and the communication telegram is to be carried out.

The register data sets 331 in the FMMU units 33 of the nodes 3 are generated in a run-up phase. The run up-phase of the network occurs during the initiation of the network nodes where a communication telegram 501 is first sent to all nodes 3 in an initial telegram to set default identification values for later use by the shift register. After the run-up phase is completed, the register data sets 331 use the information contained therein for identifying relevant units 34 to the FMMU unit 33. During the cyclic data transfer on the transmission path 2, the passing communication telegrams 501 are then each compared to the register data sets 331 of the FMMU unit 33 by a comparing unit 34 of the FMMU unit 33 and in the case of conformity, the corresponding data are read out from or inserted into the communication telegram by means of an access unit 35 (as depicted in FIGS. 3A and 3B) of the FMMU unit 33.

Figure 3A:
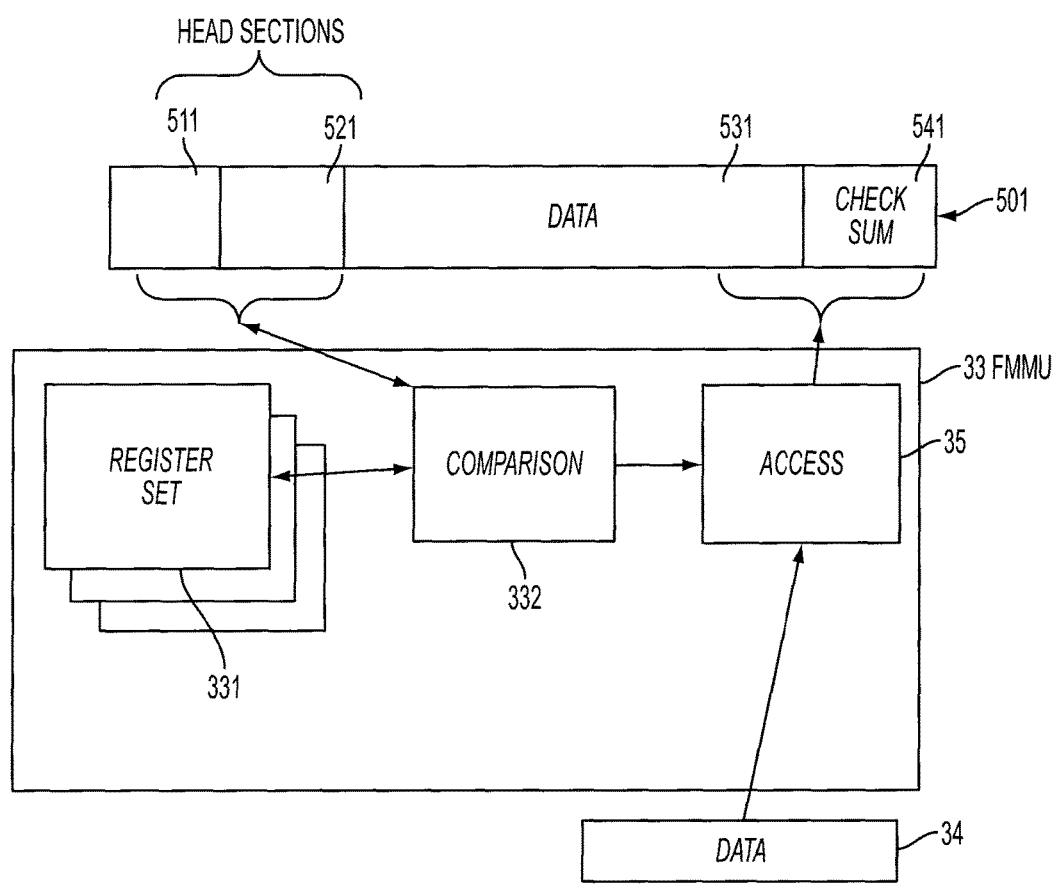
FIG. 3A shows a diagram of a sequence of steps taking place in an inventive node during a read operation.

FIG. 3A depicts a processing sequence in the FMMU unit 33 of a node 3 when receiving a read telegram. The head sections 511, 521 of the communication telegram 501 circulating on the transmission path 2 are compared (see FIG. 3B, 332) to the stored register data sets 331 in the FMMU unit 33. If this comparison shows that the data section 531 of the communication telegram comprises areas to be associated with the node, these data areas are read out from the data memory 34 of the node and inserted into the communication telegram 501 on the transmission path 2, re-calculating the check sum 541.

Figure 3B:
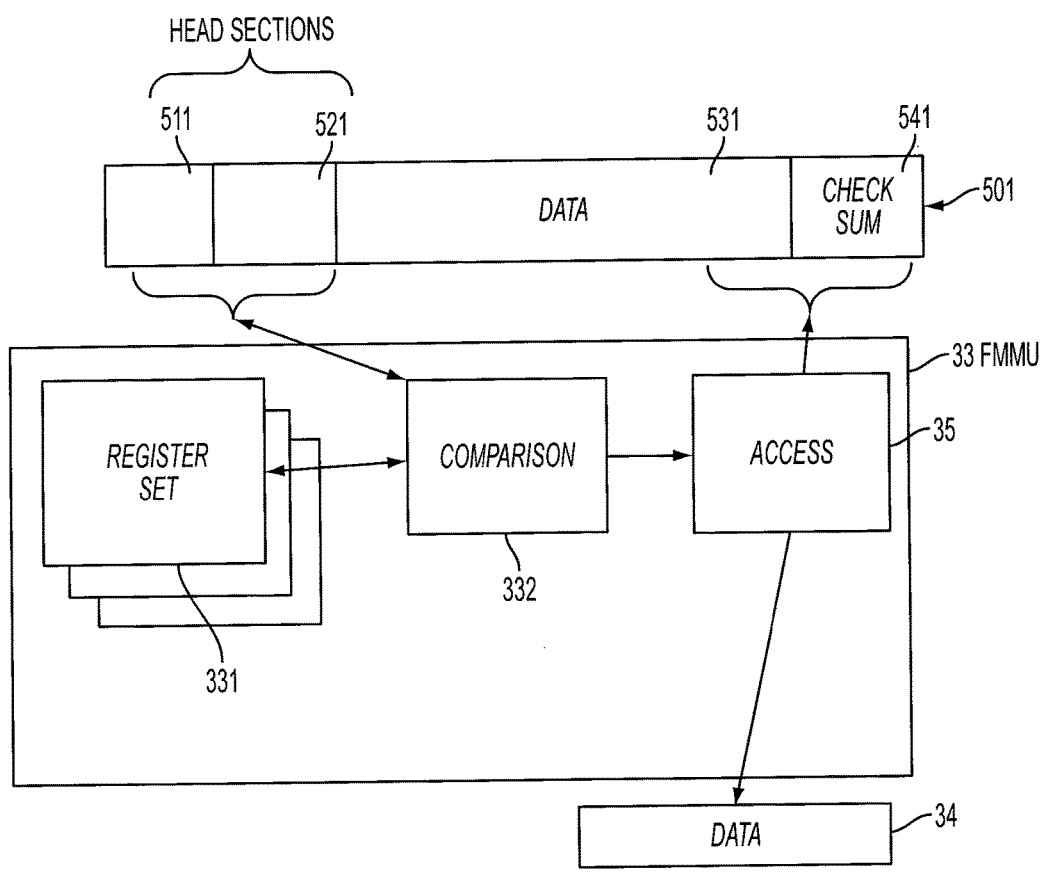
FIG. 3B shows a diagram of a sequence of steps taking place in an inventive node during a write operation.

FIG. 3B shows the processing sequence in the FMMU unit 33 of a node 3 when receiving a write telegram. Thereby, the head sections 511, 521 of the communication telegram 501 on the transmission path 2 are again compared (see FIG. 3B, 332) to the register data sets 331. In the case of conformity and if the register data set indicates that a write operation is to be performed, the corresponding data 531 is read out of the communication telegram 501 and stored in the data memory 34 of the node.

By means of the procedure described above it is possible in a simple way to carry out a data communication between arbitrary nodes connected one after the other on the transmission path 2, if the preceding node writes data into the communication telegram for the downstream node when passing through. In order to trigger rapid control processes, in particular switching processes by means of the communication telegrams transmitted in the subcycles of the transmission cycle, the data area of the communication telegram comprises a respective control date, which is written in the manner depicted in FIG. 3A by a preceding node during the passage of the communication telegram. A downstream node which is to carry out the control operation then reads out the control date, particularly according to the manner depicted in FIG. 3B, and compares it to a date stored in the data memory in order to execute a control process, e.g. the use of the control date as new control value, if a particular comparison result occurs, e.g. if the control date is larger than the stored date. By means of this procedure, rapid control operations, as they are e.g. required in the plastics industry, may be carried out in a simple manner by means of the inter-node communication.

In principle, for transmitting data on a transmission path to which a control unit and several nodes are coupled, the control unit cyclically outputs data in the form of telegrams to the transmission path in a continuous manner throughout the entire transmission cycle time, taking the transmission standard into account, wherein the nodes exchange data with the telegrams during the passage of the telegrams. The control unit thereby subdivides the transmission cycle into a number of subcycles having the same length, wherein at least one communication telegram, into which a first node may write data for a second node located downstream in the transmission path, is transmitted in each subcycle when passing through.

The continuous transmission of the telegram ensures precise reproducibility of the transmission process and thus a jitter-free transmission of the telegrams. By dividing up the transmission cycle of the control unit in the communication network into subcycles having the same length, each subcycle comprising a communication telegram, it is possible to operate the transmission process of the control unit with a long clock rate and thus with a low load, and at the same time to distribute data with a substantially higher frequency in each subcycle, e.g. in order to trigger rapid control processes. The control unit of the communication system may thus be operated at a markedly slower clock than would be required for real time communication, thus unloading the control unit. In the control unit, resources may thus be released for other tasks or the control unit may be equipped with slow and thus inexpensive hardware. By subdividing the transmission cycle of the control unit into subcycles, it is furthermore possible to perform a communication between the nodes connected downstream to the control unit within one transmission cycle, thus achieving decentralized control in a simple manner.

The communication telegram may be transmitted by the control unit at a fixed point of time in the subcycle. This procedure ensures that real time data is transferred to the nodes by means of the communication telegram, thus enabling rapid control processes.

The number and/or the length of the telegrams to be transmitted in the subcycle including the communication telegram of the control unit may be adjusted for continuous transmission of the telegrams at a predetermined transmission cycle time, in order to continuously output telegrams to the transmission path during the predetermined subcycle time. In a simple manner, this procedure allows for continuous execution of telegrams within the framework of a subcycle while simultaneously utilizing the transmission time available in the subcycle.

A first register data set may be provided in the first node, the register data set comprising an identification of a data area in the communication telegram transmitted on the transmission path, an identification of an associated memory area in the first node and a write command. A second register data set may be provided in the second node, the second register data set comprising an identification of the data area in the communication telegram transmitted on the transmission path, an identification of the associated memory area in the second node and a read command. The first and the second node each may carry out a comparison of the telegrams passing on the transmission path to the associated register data set and a data transmission takes place on the basis of the comparison result between the first and the second node via the communication telegram outputted by the control unit. By means of this, a data communication between arbitrary nodes coupled subsequently downstream to the transmission path is enabled in a simple manner, since during passage the nodes may write the desired user data into the communication telegram or read out the desired user data from the communication telegram, respectively, by comparison with the provided register data set.

The register data set may comprise a start address of the data in the communication telegram, an end address of the data or a length of a data area in the communication telegram, a start address of the associated data in the node and an identification of the data transmission as a write or read operation. This procedure allows for a quick interpretation of the communication telegram during the cycle and thus for fast data processing. The register data set may be generated in the node during a run-up phase of the communication network, thus ensuring a high flexibility in the communication network and enabling the communication network to adapt to the desired control requirements in a simple manner.

In order to be able to initiate rapid control processes, in particular switching processes with the communication telegram transmitted in the subcycles of the transmission cycle, a control date in the data area of the communication telegram may be provided which may be written by the first node during the passage of the communication telegram, whereby the second node located downstream in the transmission path reads out the control date and compares it to a predetermined date in order to carry out a control operation, when a particular comparison result occurs. By means of this procedure, rapid control mechanisms may be carried out by means of an inter-node communication, e.g. in the plastics industry.

The embodiments were described for an Ethernet protocol, however, it is possible to reconfigurate other network protocols as well in order to allow for a fast inter-node communication along a transmission path.

The preceding description describes exemplary embodiments of the invention. The features disclosed therein and the claims and the drawings can, therefore, be useful for realizing the invention in its various embodiments, both individually and in any combination. While the foregoing is directed to embodiments of the invention, other and further embodiments of this invention may be devised without departing from the basic scope of the invention, the scope of the present invention being determined by the claims that follow.

The invention claimed is:

1. A method for transmitting data on a ring-shaped transmission path to which a control unit and several nodes are connected, permission to output discrete telegrams to the communication path being given to the control unit and not the nodes, the control unit cyclically outputting data in the form of telegrams to the transmission path, and controlling the transmission process in order to continuously output telegrams during an entire transmission cycle time taking a transmission standard into account, the method comprising the steps of:

the nodes exchanging data using the telegrams when passing therethrough, wherein the control unit subdivides a transmission cycle into a number of subcycles having the same length, the control unit transmitting at least one communication telegram in each subcycle into which a first node writes in data for a second node located downstream in the transmission path into the communication telegram when passing through, the second node reading out the data written into the at least one communication telegram when passing through, the control unit transmitting at least one further telegram, the further telegram being any of a data telegram for the nodes and a placeholder telegram for filling up the subcycle.

2. The method of claim 1, wherein the communication telegram is transmitted by the control unit at a fixed point of time in the subcycle.

3. The method of claim 1, wherein for continuous transmission of the telegrams at a predetermined transmission cycle time any of the number and the length of the telegrams to be sent in a subcycle including the at least one communication telegram is adjusted by the control unit in order to continuously output telegrams to the transmission path during the entire predetermined transmission cycle time.

4. The method of claim 1, wherein a first register data set is generated in the first node, the first register data set comprising an identification of a data area in the communication telegram transmitted on the transmission path, an identification of an associated memory area within the first node and a write command, and in that a second register data set is generated in the second node, the second register data set comprising the identification of the data area in the communication telegram transmitted on the transmission path, an identification of an associated memory area in the second node and a read command, the first node and the second node each carrying out a comparison between the telegrams passing through the transmission path and the associated register data set and a data transfer taking place on the basis of the comparison result between the first node and the second node via the communication telegram sent out by the control unit.

5. The method of claim 4, wherein the first and second register data sets each comprise a start address of the data in the communication telegram, an end address of the data or a length of a data area in the communication telegram, a start address of the associated data within the node and an identification of the data transmission as a write or read operation.

6. The method of claim 4, wherein the first and second register data sets are generated within the node during a run-up phase.

7. The method of claim 4, wherein the data area in the communication telegram comprises a control date written by the first node during the cycle of the communication telegram, wherein the second node located downstream in the transmission path reads out the control date and compares it to a predetermined date in order to carry out a control operation if a particular comparison result occurs.

8. The method of claim 1, wherein the data are transmitted in the form of Ethernet telegrams.

9. A communication network comprising a ring-shaped transmission path to which a control unit and several nodes are connected, permission to output discrete telegrams to the communication path being given to the control unit and not the nodes, the control unit cyclically outputting data in the form of telegrams to the transmission path, thereby controlling the transmission process in order to continuously output telegrams during an entire transmission cycle time taking a transmission standard into account, and the nodes exchanging data using the telegrams when passing therethrough, wherein the control unit subdivides a transmission cycle into a number of subcycles having the same length, the control unit transmitting at least one communication telegram in each subcycle into which a first node writes data for a second node located downstream in the transmission path into the communication telegram when passing through, the second node reading out the data written into the at least one communication telegram when passing through, the control unit transmitting at least a further telegram in each subcycle, the further telegram being any of a data telegram for the nodes and a placeholder telegram for filling up the subcycle.

10. The communication network of claim 9, wherein the control unit transmits the communication telegram at a fixed point of time in the subcycle.

11. The communication network of claim 9, wherein for continuous transmission of the telegrams at a predetermined transmission cycle time, the control unit adjusts any of the number and the length of the telegrams to be transmitted within a subcycle including the at least one communication telegram in order to continuously output telegrams to the transmission path during the entire predetermined transmission cycle time.

12. The communication network of claim 9, wherein in the first node a first register data set is present comprising an identification of a data area in the communication telegram transmitted on the transmission path, an identification of an associated memory area in the first node and a write command, and in that in the second node a second register data set is present comprising the identification of the data area in the communication telegram transmitted on the transmission path, an identification of an associated memory area in the second node and a read command, the first node and the second node each carrying out a comparison of the telegrams passing through the transmission path to the first register data set and the second register data set respectively and a data transfer taking place on the basis of the comparison result.

13. The communication network of claim 12, wherein the first and second register data sets each comprise a start address of the data within the communication telegram, an end address of the data or a length of the data area in the communication telegram, a start address of the associated data in the node and an identification of the data transmission as a write or read operation.

14. The communication network of claim 12, wherein the first and second register data set are generated during a run-up phase in the first and the second node, respectively.

15. The communication network of claim 12, wherein the data area in the communication telegram comprises a control date written by the first node during the passage of the communication telegram, the second node located downstream on the transmission path reads out the control date and compares it to a predetermined date in order to carry out a control operation if a particular comparison result occurs.

16. The communication network of claim 12, wherein the data are transmitted in the form of Ethernet telegrams.

17. A control unit for a communication network comprising a ring-shaped transmission path to which the control unit and several nodes are connected, permission to output discrete telegrams to the communication path being given to the control unit and not the nodes, the control unit comprising:
   a processing unit for converting data to be sent into telegrams according to a transmission standard, and a transmission unit for cyclic transmission of the provided telegrams on the transmission path, the processing unit controlling the transmission operation of the transmission unit in order to continuously output telegrams during an entire transmission cycle time considering a transmission standard, wherein
   the processing unit subdivides a transmission cycle into a number of subcycles having the same length and provides at least one communication telegram in each subcycle wherein a first node writes data into the telegram for a second node located downstream in the transmission path when passing through, the second node reading out the data written into the at least one communication telegram when passing through, the control unit transmitting at least one further telegram in each subcycle, the further telegram being any of a data telegram for the nodes and a placeholder telegram for filling up the subcycle.

18. The control unit of claim 17, wherein the processing unit sends out the communication telegram at a fixed point of time in the subcycle.

19. The control unit of claim 17, wherein for a continuous transmission of the telegrams at a predetermined transmission cycle time, the processing unit adjusts the number and/or the length of the telegrams to be sent in a subcycle including the at least one communication telegram in order to continuously output telegrams to the transmission path during the entire predetermined transmission cycle time.

20. The control unit of claim 17, wherein the data are transmitted in the form of Ethernet telegrams.

* * * * *